US008918683B2

(12) United States Patent
Yoon et al.

(10) Patent No.: US 8,918,683 B2
(45) Date of Patent: Dec. 23, 2014

(54) ONE-TIME PROGRAM CELL ARRAY CIRCUIT AND MEMORY DEVICE INCLUDING THE SAME

(75) Inventors: Hyunsu Yoon, Gyeonggi-do (KR); Youncheul Kim, San Jose, CA (US); Kwanweon Kim, Gyeonggi-do (KR); Jeongtae Hwang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 188 days.

(21) Appl. No.: 13/619,115

(22) Filed: Sep. 14, 2012

(65) Prior Publication Data

US 2014/0082438 A1    Mar. 20, 2014

(51) Int. Cl.
*G11C 29/00*         (2006.01)

(52) U.S. Cl.
USPC .......................................... 714/710; 714/764

(58) Field of Classification Search
CPC ....... G11C 7/16; G11C 17/18; H01L 23/5256
USPC ............ 327/525; 365/189.05, 51; 714/18, 42, 714/719, 746, 710, 764
See application file for complete search history.

(56) References Cited

U.S. PATENT DOCUMENTS

| | | | |
|---|---|---|---|
| 6,823,485 B1 * | 11/2004 | Muranaka | 714/719 |
| 7,152,187 B2 * | 12/2006 | Tran et al. | 714/42 |
| 7,269,047 B1 | 9/2007 | Fong et al. | |
| 7,486,577 B2 * | 2/2009 | Kim et al. | 365/200 |
| 8,193,851 B2 * | 6/2012 | Kim | 327/525 |
| 8,576,638 B2 * | 11/2013 | Kim et al. | 365/189.05 |
| 2005/0160332 A1 * | 7/2005 | Hirabayashi | 714/718 |
| 2007/0121359 A1 * | 5/2007 | Kanda | 365/51 |
| 2008/0298128 A1 * | 12/2008 | Kang et al. | 365/185.18 |
| 2009/0282308 A1 * | 11/2009 | Gutsche et al. | 714/746 |
| 2010/0083050 A1 * | 4/2010 | Ohyama | 714/42 |

* cited by examiner

*Primary Examiner* — David Ton
(74) *Attorney, Agent, or Firm* — IP & T Group LLP

(57) ABSTRACT

A one-time program cell array circuit includes a cell array configured to include a plurality of one-time program memory cells, and to program an inputted program data and output a stored program data as a read data, a code generation circuit configured to generate an error correction code to be programmed in the cell array based on the inputted program data during a program operation; and an error detection circuit configured to detect an error of the read data based on the error correction code and the read data that are outputted from the cell array during a read operation and to be enabled or disabled in response to a first enable signal. The concern caused by applying the error correction scheme to the one-time program cell array circuit may be resolved by controlling the enabling or disabling of an error correction scheme, while increasing reliability.

7 Claims, 6 Drawing Sheets

ONE-TIME PROGRAM CELL ARRAY CIRCUIT AND MEMORY DEVICE INCLUDING THE SAME

BACKGROUND

1. Field

Exemplary embodiments of the present invention relate to a one-time program cell array circuit including a plurality of one-time program cells.

2. Description of the Related Art

A one-time program memory cell is a memory cell whose data logic value cannot be changed once the memory cell is programmed. The one-time program memory cell includes memory cells using laser fuses and e-fuses.

FIG. 1 is a schematic of an e-fuse that is formed of a transistor, and the e-fuse that operates as either a resistor or a capacitor.

Referring to FIG. 1, the e-fuse includes a transistor T, and a power source voltage is supplied to a gate G while a ground voltage is supplied to a drain/source D/S.

If a power source voltage of an ordinary level that the transistor T may tolerate is supplied to the gate G, then the e-fuse may operate as a capacitor C. Therefore, no current flows between the gate G and the drain D or the source S. However, if a high voltage that the transistor T cannot tolerate is supplied to the gate G, then the gate oxide of the transistor T is destroyed to short the gate G and the drain source D/S. As a result, the e-fuse may operate as a resistor R. Therefore, current flows between the gate G and the drain/source D/S.

Based on these results, the data of an e-fuse is recognized from the resistance value between the gate G and the drain/source D/S. The data of the e-fuse may be recognized by (1) enlarging the size of the transistor T, or (2) using an amplifier, instead of increasing the size of the transistor T, and sensing the current flowing through the transistor T. If the transistor T is enlarged, the data of the e-fuse may be recognized without performing a sensing operation. The above two methods, however, have concerns regarding dimensional restrictions because the transistor T that constitutes the e-fuse has to be enlarged or each e-fuse has to be equipped with an amplifier for amplifying data.

U.S. Pat. No. 7,269,047 discloses a technology for forming an e-fuse in a type of an e-fuse array in order to reduce the area occupied by the e-fuse.

FIG. 2 is a block view illustrating a conventional e-fuse cell array 200.

Referring to FIG. 2, the e-fuse cell array 200 includes memory cells 201 to 216 that are arrayed in N rows and M columns. The memory cells 201 to 216 include memories M1 to M16 and switches S1 to S16, respectively. Each of the memories M1 to M16 is an e-fuse that has the characteristics of a resistor or a capacitor based on whether it is ruptured or not. In other words, the e-fuses M1 to M16 may be regarded as resistive memories that store data based on the level of resistance. The switches S1 to S16 electrically connect the memories M1 to M16 with column lines BL1 to BLM under the control of row lines WLR1 to WLRN.

Hereafter, it is assumed that a second row is a selected row, and a $M^{th}$ column is a selected column, in other words, it is assumed that a memory cell 208 is a selected memory cell. The voltages supplied to the selected memory cell 208 and unselected memory cells 201 to 207 and 209 to 216 during a program and read operation are described below.

Program Operation

The selected row line WLR2 is enabled and the other row lines WLR1 and WLR3 to WLRN are disabled. As a result, switches S5 to S8 are turned on, while switches S1 to S4 and S9 to S16 are turned off. A high voltage that could destroy the gate oxide of the e-fuse, which is generally generated by pumping a power source voltage, is supplied to the program/read line WLP2 of the selected row, and a voltage of a lower level, e.g., a ground voltage, is supplied to the other program/read lines WLP1, and WLP3 to WLPN. The selected column line BLM is coupled with a data access circuit, and the unselected column lines BL1 to BLM-1 float. If an input data is a program data, e.g., '1', then the data access circuit drives the selected column line BLM at a low-level voltage to program (or rupture) the memory M8 of the selected memory cell 208. If the input data is not a program data, e.g., '0', then the data access circuit drives the selected column line BLM at a high-level voltage so that the memory M8 of the selected memory cell 208 may not be programmed.

Because the unselected column lines BL1 to BLM-1 float, the memories M5 to M7 may not be programmed even though a high voltage is supplied to the gates.

Read Operation

The selected row line WLR2 is enabled, and the other row lines WLR1 and WLR3 to WLRN are disabled. As a result, switches S5 to S8 are turned on, and switches S1 to S4 and S9 to S16 are turned off. A voltage of an appropriate level for a read operation is supplied to the program/read line WLP2 of the selected row, and a low voltage, e.g., a ground voltage, is supplied to the other program/read lines WLP1, and WLP3 to WLPN. The selected column line BLM is coupled with a data access circuit, and the unselected column lines BL1 to BLM-1 float. If current flows through the selected column line BLM, then the data access circuit may recognize that the memory M8 is programmed. In other words, the data access circuit may recognize that the data of the selected memory cell 208 is '1'. If no current flows through the selected column line BLM, then the data access circuit may recognize that the memory M8 is not programmed. In other words, the data access circuit may recognize that the data of the selected memory cell 208 is '0'.

Although it is illustrated herein that one column line BLN is selected among the column lines BL1 to BLM, a plurality of column lines may be selected at one time. In other words, a plurality of memory cells that belong to one row may be simultaneously programmed or read.

FIG. 3 is a block view of a conventional one-time program cell array circuit including the e-fuse cell array 200 shown in FIG. 2.

Referring to FIG. 3, the one-time program cell array circuit includes the e-fuse cell array 200 shown in FIG. 2, a row circuit 310, a column decoding circuit 320, and a data access circuit 330.

The row circuit 310 controls the row lines WLR1 to WLRN and the program/read lines to perform a program operation or a read operation, as mentioned above. A row address ROW_ADD inputted to the row circuit 310 designates a row selected among the multiple rows, and a program/read signal PG/RD directs a program operation or a read operation.

The column decoding circuit 320 electrically connects the data access circuit 330 with a selected column line that is selected based on a column address COL_ADD among the multiple column lines BL1 to BLM. In this exemplary embodiment of the present invention, a case where eight column lines are selected among the multiple column lines BL1 to BLM.

The data access circuit 330 controls the access of data of the selected column lines that are selected by the column decoding circuit 320. During a program operation, the data access circuit 330 controls the selected column lines selected based on an input data DATA<0:7> to be programmed or not to be programmed. During a read operation, the data access circuit 330 senses whether current flows through the selected column lines or not, and it outputs an output data DATA<0:7>.

The one-time program cell array circuit including an e-fuse may store data if the gate oxide of the transistor is destroyed, or may not store data if the gate oxide of the transistor is not destroyed. The gate oxide may be or may not be easily destroyed based on the characteristics of the transistor. In short, a resistive memory device may have a failure based on the characteristics of the transistor. Therefore, it is required to develop a technology that may increase the reliability of a one-time program cell array circuit.

SUMMARY

Exemplary Embodiments of the present invention are directed to increasing the reliability of a one-time program cell array circuit.

In accordance with an exemplary embodiment of the present invention, a one-time program cell array circuit includes a cell array configured to include a plurality of one-time program memory cells, and to program an inputted program data and output a stored program data as a read data, a code generation circuit configured to generate an error correction code to be programmed in the cell array based on the inputted program data during a program operation, and an error detection circuit configured to detect an error of the read data based on the error correction code and the read data that are outputted from the cell array during a read operation and to be enabled or disabled in response to a first enable signal.

In accordance with another exemplary embodiment of the present invention, a one-time program cell array circuit includes a cell array configured to include a plurality of one-time program memory cells that are arrayed in a plurality of rows and a plurality of columns, a row decoding circuit configured to select a row in the cell array, a column decoding circuit configured to select columns in the cell array, a code generation circuit configured to generate an error correction code based on a program data, a data access circuit configured to program the program data and the error correction code in selected columns that are selected by the column decoding circuit during a program operation, and read a read data and an error correction code corresponding to the read data from the selected columns that are selected by the column decoding circuit during a read operation, and an error detection circuit configured to detect an error of the read data based on the error correction code and the read data that are read through the data access circuit during the read operation to produce an error detection result and to be enabled or disabled in response to a first enable signal.

In accordance with another exemplary embodiment of the present invention, a memory device includes a plurality of memory banks, a plurality of repair circuits configured to perform a repair operation in the memory banks, a plurality of test mode circuits configured to perform a setup operation, and a one-time program cell array circuit configured to store repair information to be used in the repair circuits and setup information to be used in the test mode circuits, and to have an error correction function enabled when the repair information is inputted or outputted and disabled when the setup information is inputted or outputted.

DETAILED DESCRIPTION

Figure 1:
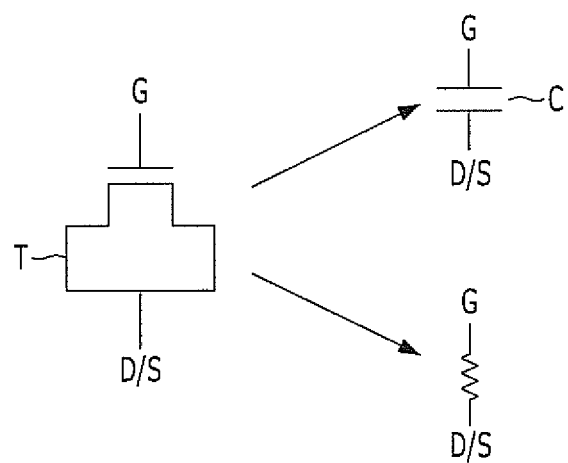
FIG. 1 is an illustration of an e-fuse that is formed of a transistor, where the e-fuse operates as a resistor or a capacitor.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 4:
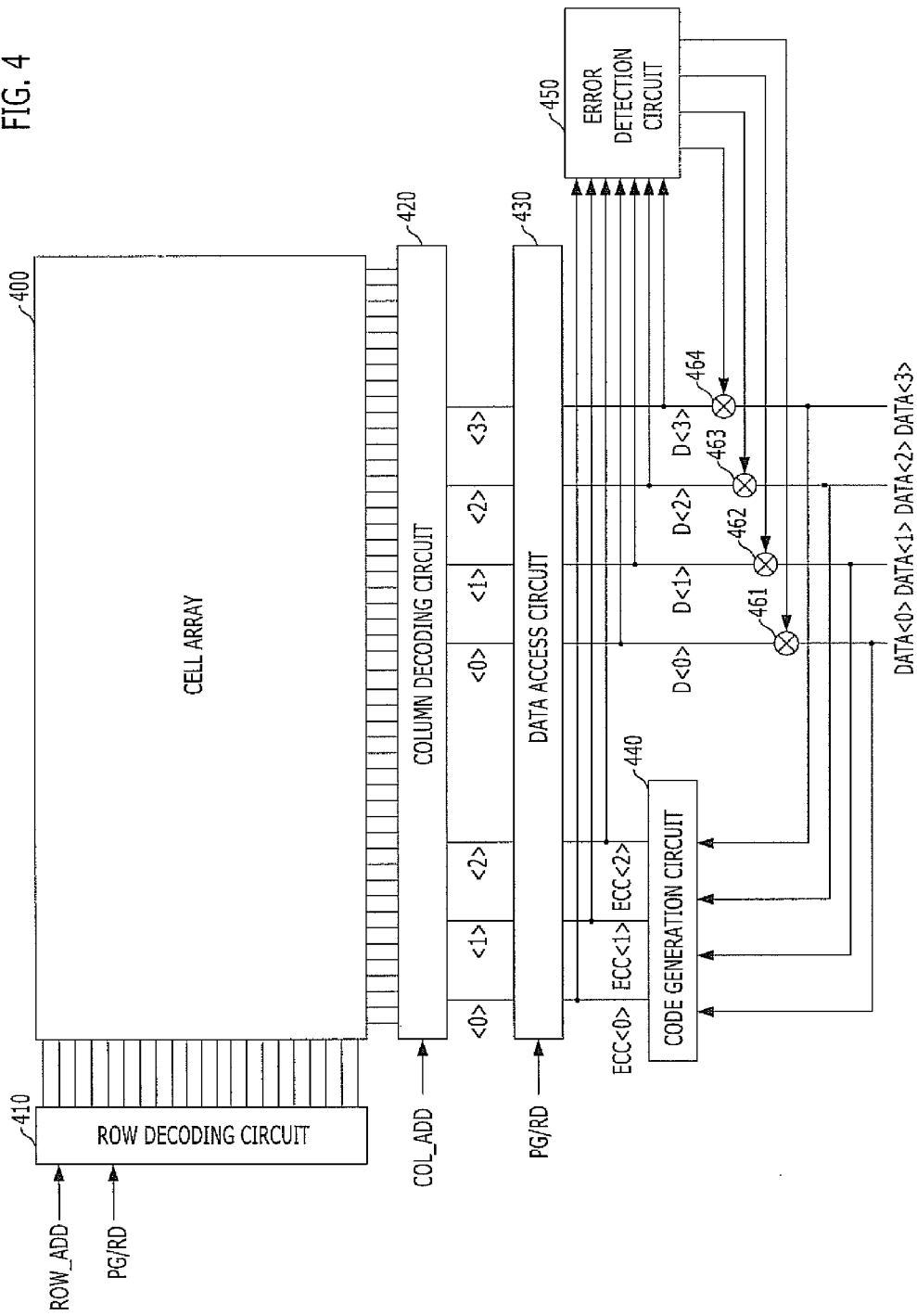
FIG. 4 is a block view of a one-time program cell array circuit with an application of an error correction scheme in accordance with an embodiment of the present invention.

FIG. 4 is a block view of a one-time program cell array circuit with an application of an error correction scheme in accordance with an embodiment of the present invention.

Referring to FIG. 4, the one-time program cell array circuit includes a cell array 400, a row decoding circuit 410, a column decoding circuit 420, a data access circuit 430, a code generation circuit 440, an error detection circuit 450, and correction units 461 to 464.

Figure 2:
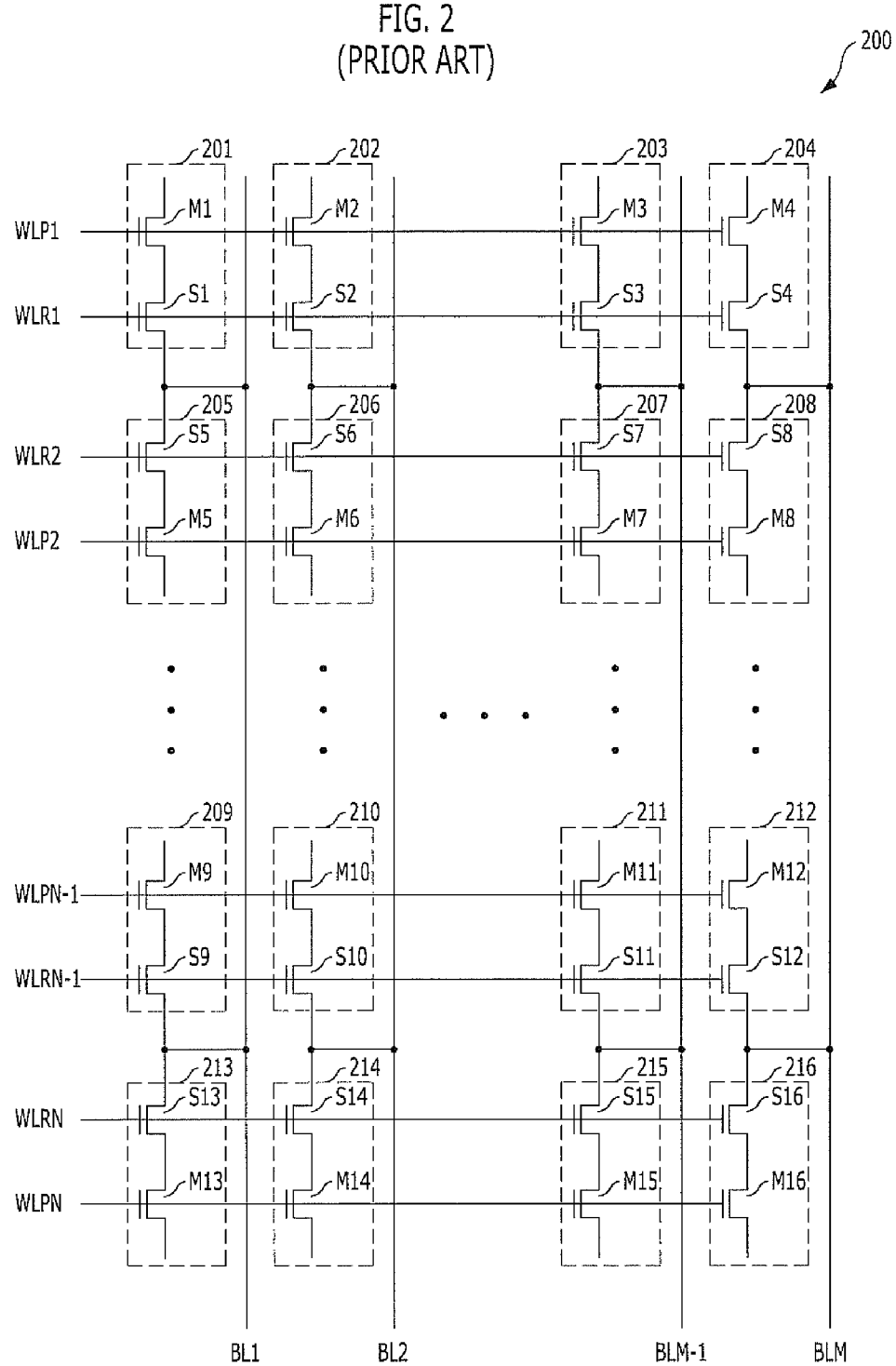
FIG. 2 is a block view illustrating a conventional e-fuse cell array 200.
Figure 3:
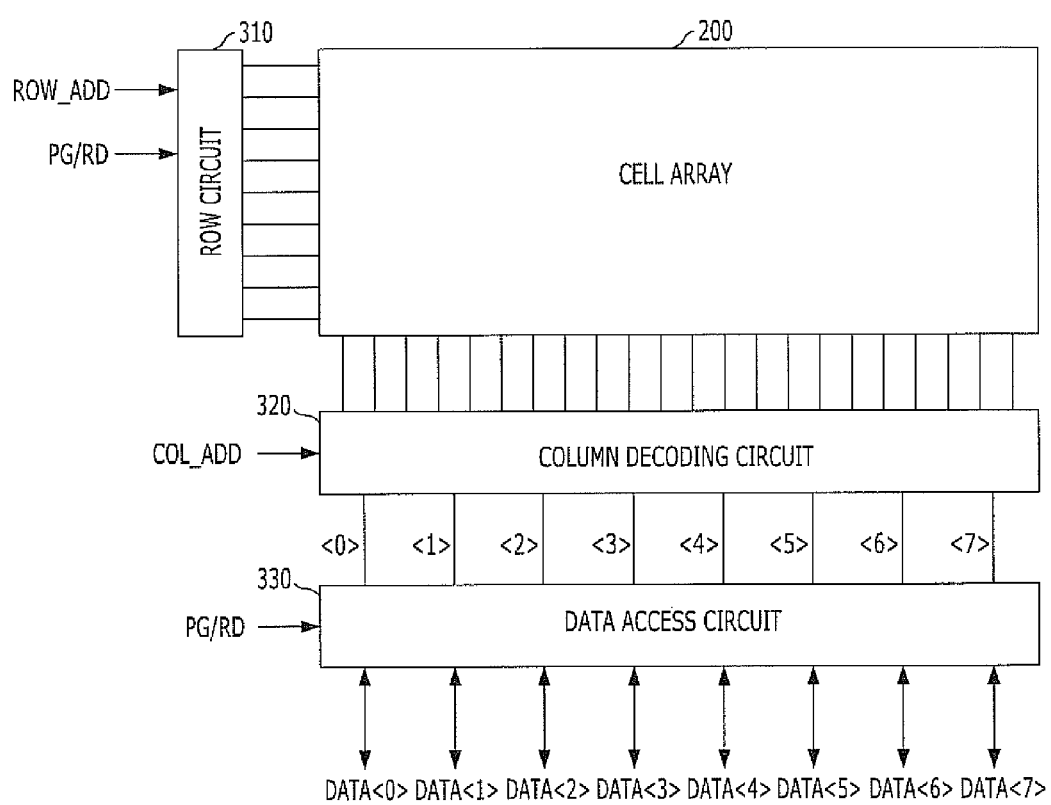
FIG. 3 is a block view of a conventional one-time program cell array circuit including the e-fuse cell array 200 shown in FIG. 2.

The cell array 400 stores data and an error correction code (ECC). The cell array 400 may be formed as shown in FIG. 2.

The code generation circuit 440 may generate an error correction code ECC<0:2> based on a data DATA<0:3> that is inputted to the one-time program cell array circuit. The drawing exemplarily illustrates a case where a 3-bit error correction code ECC<0:2> is generated from a 4-bit data DATA<0:3>. However, the number of bits of the error correction code may be changed based on an FCC scheme.

The error detection circuit 450 may receive the read error correction code S<0:2> and a read data D<0:3> that is read from the cell array 400, and verifies whether there is an error in the read data D<0:3>. If there is an error in the read data D<0:3>, the error detection circuit 450 informs the correction units 461 to 464 of the error so that the erroneous read data D<0:3> may be corrected.

The correction units 461 to 464 may transfer the input data DATA<0:3> to the data access circuit 430 during a program operation (DATA<0:3>=D<0:3>). During a read operation, the correction units 461 to 464 may transfer the output data D<0:3> that is outputted from the data access circuit 430 as is or after inversing it upon receipt of the command from the error detection circuit 450.

The row decoding circuit 410 may control row-based lines WLR and WLP shown in FIG. 2 in such a manner that a row selected based on a row address ROW_ADD could perform a program operation or a read operation.

The column decoding circuit 420 may electrically connect the data access circuit 430 with column lines BL selected based on a column address COL_ADD. In an exemplary embodiment of the present invention, the column decoding circuit 420 electrically connects the data access circuit 430 with seven column lines of the cell array 400. This is because the exemplary embodiment illustrates a case where the 4-bit data D<0:3> and the 3-bit error correction code ECC<0:2> corresponding to the 4-bit data D<0:3> are simultaneously programmed or read, and the number of column lines selected by the column decoding circuit 420 may be changed.

The data access circuit 430 may control an access of data of the column lines that are selected by the column decoding circuit 420. A program operation or a read operation of the error correction code ECC<0:2> is performed in three column lines among the 7 column lines selected by the column decoding circuit 420, and a program operation or a read operation of the data D<0:3> is performed in the remaining four column lines.

According to the embodiment of the present invention shown in FIG. 4, even though an error occurs in the data stored in the cell array 400, the error may be corrected through the error correction scheme. Therefore, it may be possible to increase the reliability of the one-time program cell array circuit.

The use of the error correction scheme, however, has a drawback in that it does not allow a change in the data stored in the cell array 400. The logic value of a data of a one-time program memory cell may be changed from '0' to '1', but the logic value of the data cannot be changed from '1' to '0'. For example, when it is assumed that a data of '0110' is programmed at a particular address of the one-time program cell array circuit, and the particular address is to be programmed again with another data of '0111', because the data is changed from '0' to '1', this kind of re-programming may be performed. If the error correction scheme is not used, the re-programmed data '0111' may be read as if there is no particular error. However, if the error correction scheme is used, the re-programmed data '0111' cannot be read. This is because the code generation circuit 440 generates an error correction code for the initially programmed data '0110', and the re-programmed data '0111' is recognized as an error based on the error correction code.

In short, the one-time program cell array circuit has a drawback in that the use of the error correction scheme does not allow a portion of programmed data to be changed.

Figure 5:
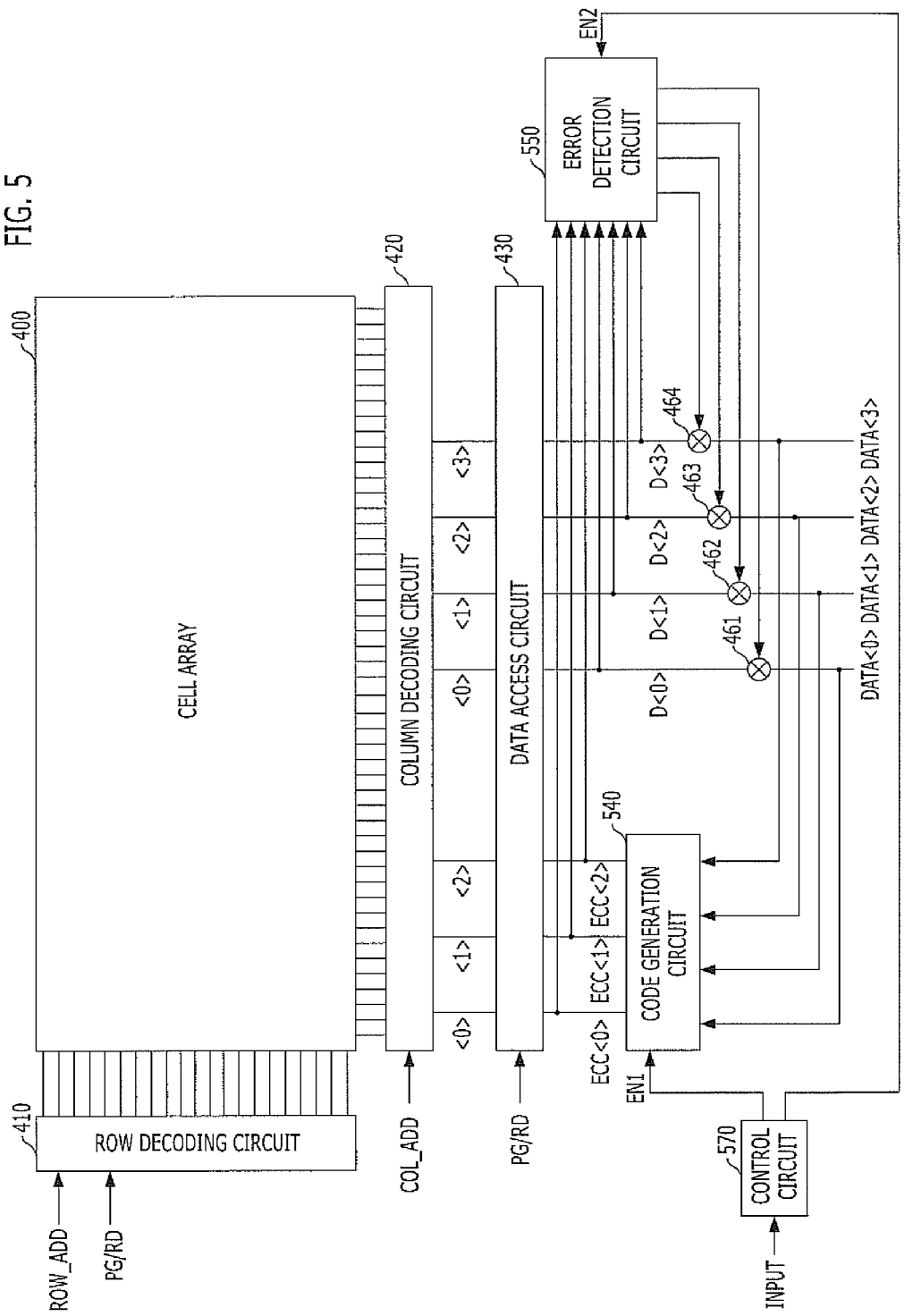
FIG. 5 is a block view of a one-time program cell array circuit with an improved error correction scheme in accordance with another embodiment of the present invention.

FIG. 5 is a block view of a one-time program cell array circuit with an improved error correction scheme in accordance with another embodiment of the present invention.

The one-time program cell array circuit of FIG. 5 includes a cell array 400, a row decoding circuit 410, a column decoding circuit 420, a data access circuit 430, a code generation circuit 540, an error detection circuit 550, correction units 461 to 464, and a control circuit 570.

The error detection circuit 550 may be enabled or disabled in response to an enable signal EN2. If the error detection circuit 550 is enabled, then the error detection circuit 550 operates the same as the error detection circuit 450 of FIG. 4. If the error detection circuit 550 is disabled, then the correction units 461 to 464 do not perform an error correction operation. In other words, if the error detection circuit 550 is disabled, then the error detection circuit 550 transfers information saying that there is no error to the correction units 461 to 464, regardless of the values of the error correction code ECC<0:2> and the data D<0:3> read from the cell array 400.

The code generation circuit 540 is enabled or disabled in response to an enable signal EN1. If the code generation circuit 540 is enabled, then the code generation circuit 540 operates the same as the code generation circuit 440 shown in FIG. 4. If the code generation circuit 540 is disabled, then an error correction code ECC<0:2> is not generated in the code generation circuit 540. In other words, if the code generation circuit 540 is disabled, then an error correction code ECC<0:2> of (0, 0, 0) is generated in the code generation circuit 540, and as a result, any error correction code is not programmed in the cell array 400.

The control circuit 570 may control the enabling/disabling of the enable signals EN1 and EN2. The enabling or disabling of the enable signals EN1 and EN2 may be controlled by one of the following two methods. The input to the control circuit 570 is external information that is inputted from the outside source to enable or disable the enable signals EN1 and EN2, such as information representing a kind of data or information representing whether the data is re-programmed or not.

(1) Controlling Enabling or Disabling of the Enable Signals En1 and En2 Based on a Kind of Data The one-time program cell array circuit may store diverse kinds of data. Some of the data may be a kind of data that does not have any possibility that the data can be changed from the initial programming, and some others may be a kind of data that has a possibility that the data may be changed from the initial programming. If the data stored in the one-time program cell array circuit is a data that may not be changed permanently, then the control circuit 570 enables the enable signals EN1 and EN2 to use the error correction scheme of the one-time program cell array circuit. If the data stored in the one-time program cell array circuit is a data that may be changed from the initial programming, then the control circuit 570 disables the enable signals EN1 and EN2 to not use the error correction scheme of the one-time program cell array circuit.

If the one-time program cell array circuit is used in a memory device, such as a Dynamic Random Access Memory (DRAM) device or a flash memory device, then the one-time program cell array circuit usually stores repair and setup information. The repair information is generated after the testing of the memory device ends, and it is a kind of data that may not be changed. Thus, if the repair information is programmed or read in/from the one-time program cell array circuit, then the enable signals EN1 and EN2 are enabled and the error correction scheme of the one-time program cell array circuit is used. The setup information is a kind of data that may be changed due to several internal/external factors of the memory device. Therefore, if the setup information is programmed or read in/from the one-time program cell array circuit, then the enable signals EN1 and EN2 are disabled and the error correction scheme of the one-time program cell array circuit is not used. When the error correction scheme is not used, the reliability of the one-time program cell array circuit may be decreased. However, the non-use of the error correction scheme may be advantageous in that the data stored in the one-time program cell array circuit may be changed.

(2) Controlling Enabling or Disabling of the Enable Signals En1 and En2 Based on Whether or Not Data is Re-Programmed If the one-time program cell array circuit is initially programmed with a data, then the enable signals EN1 and EN2 are enabled, and thus, the error correction scheme may be used. However, if the one-time program cell array circuit is re-programmed (in other words, if the data programmed in the one-time program cell array circuit is changed), then the enable signals EN1 and EN2 are disabled. Thus, the error correction scheme is not used during a program or read operation of the changed data, which allows the data to be changed.

According to the embodiment of FIG. 5, which is described above, the error correction scheme used in the one-time program cell array circuit is enabled or disabled based on the condition. Therefore, the data stored in the one-time program cell array circuit may be changed while increasing the reliability of the one-time program cell array circuit.

If the error correction scheme is used, the data cannot be changed because the error detection circuit 550 recognizes the changed data as an error. Therefore, the purpose of the present invention may be achieved by designing the code generation circuit 540 to be always enabled and designing the error detection circuit 550 to be enabled or disabled based on an enable signal. Also, although FIG. 5 illustrates the enable signals EN1 and EN2 as different signals, the enable signals EN1 and EN2 may be the same signals.

Figure 6:
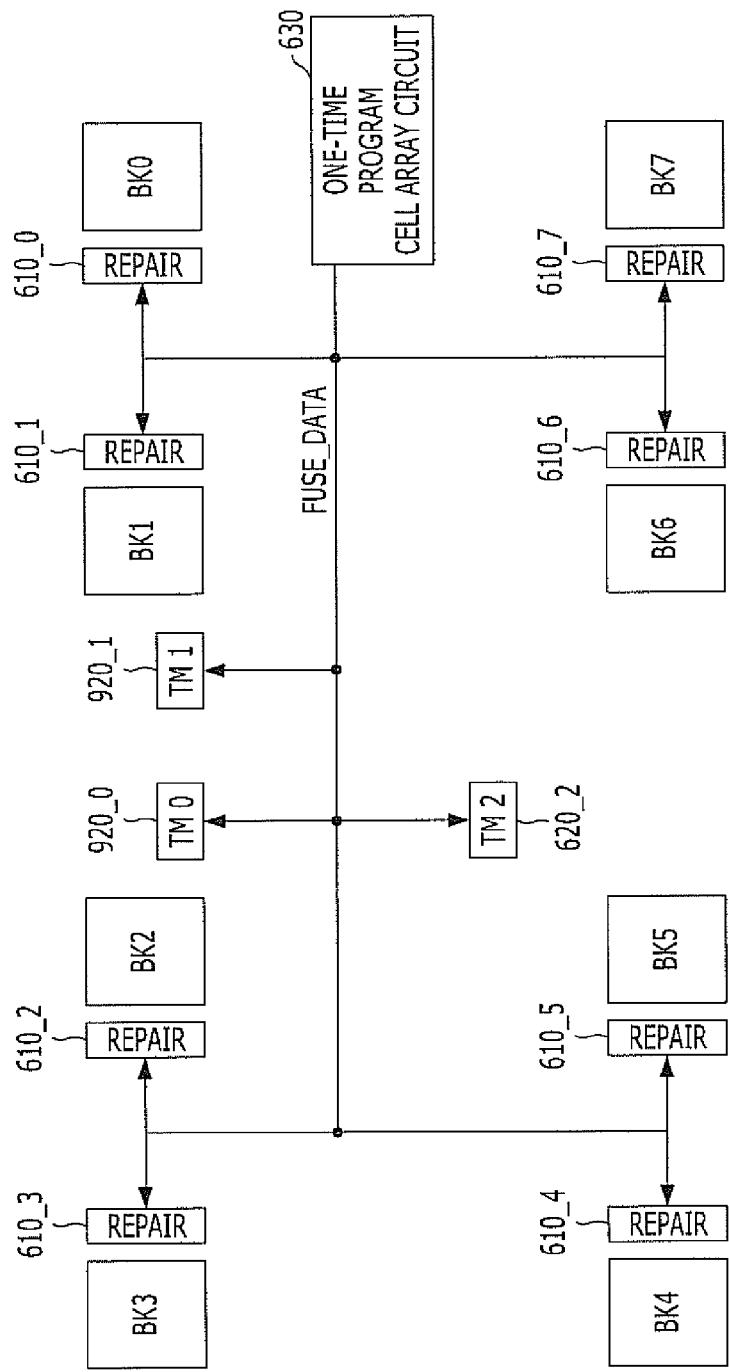
FIG. 6 is a block view of a memory device to which the one-time program cell array circuit shown in FIG. 5 is applied.

FIG. 6 is a block view of a memory device to which the one-time program cell array circuit shown in FIG. 5 is applied.

Referring to FIG. 6, the memory device includes a plurality of memory banks BK0 to BK7, a plurality of repair circuits 610_0 to 610_7, a plurality of test mode circuits 620_0 to 620_2, and a one-time program cell array circuit 630. The one-time program cell array circuit 630 is the same as the one-time program cell array circuit shown in FIG. 5.

Each of the memory banks BK0 to BK7 includes a plurality of memory cells. The memory cells may be DRAM cells. The memory banks BK0 to BK7 are provided with the repair circuits 610_0 to 610_7, respectively. The repair circuits 610_0 to 610_7 perform a repair operation for the memory banks BK0 to BK7, respectively. The repair operation is an operation of replacing failed cells with redundant cells in the memory banks BK0 to BK7. If memory cells of the memory banks BK0 to BK7 are failed memory cells, then the information on the failed memory cells is transferred from the one-time program cell array circuit 630.

The test mode circuits 620_0 to 620_2 are circuits for setting (or tuning) diverse conditions needed for the operation of the memory device. For example, the test mode circuit 620_0 may be a circuit for setting a parameter, such as latency of the memory device, and the test mode circuits 620_1 and 620_2 may be circuits for setting the levels of diverse internal voltages that are used in the inside of the memory device.

The one-time program cell array circuit 630 stores the repair and setup information. The information stored in the one-time program cell array circuit 630 are transferred to the repair circuits 610_0 to 610_7 and the test mode circuits 620_0 to 620_2 during an initialization operation of the memory device. The repair information stored in the one-time program cell array circuit 630 is transferred to the repair circuits 610_0 to 610_7, whereas the setup information of the one-time program cell array circuit 630 is transferred to the test mode circuits 620_0 to 620_2. While the one-time program cell array circuit 630 performs an operation of programming or reading the repair information, the error correction scheme of the one-time program cell array circuit 630 may be used. While the one-time program cell array circuit 630 performs an operation of programming or reading the setup information, the error correction scheme of the one-time program cell array circuit 630 may not be used.

According to above embodiments of the present invention, an error correction scheme is applied to a one-time program cell array circuit. In this way, a concern caused by applying the error correction scheme to the one-time program cell array circuit may be solved by controlling the enabling or disabling of the error correction scheme, while increasing the reliability of the one-time program cell array circuit.

While the present invention has been described with respect to the specific embodiments, it will be apparent to those skilled in the art that various changes and modifications may be made without departing from the spirit and scope of the invention as defined in the following claims.

What is claimed is:

1. A one-time program cell array circuit, comprising:
a cell array configured to include a plurality of one-time program memory cells, and to program an inputted program data and output a stored program data as a read data;
a code generation circuit configured to generate an error correction code to be programmed in the cell array based on the inputted program data during a program operation; and
an error detection circuit configured to detect an error of the read data based on the error correction code and the read data that are outputted from the cell array during a read operation and to be enabled or disabled in response to a first enable signal,
wherein the first enable signal is enabled if the program data corresponding to the read data maintains the same value from an initial programming moment, and the first enable signal is disabled otherwise.

2. The one-time program cell array circuit of claim 1, wherein the code generation circuit is enabled or disabled in response to a second enable signal.

3. The one-time program cell array circuit of claim 2, wherein the first enable signal and the second enable signal are the same signals.

4. The one-time program cell array circuit of claim 1, wherein each of the one-time program memory cells includes an e-fuse.

5. A one-time program cell array circuit, comprising:
a cell array configured to include a plurality of one-time program memory cells that are arrayed in a plurality of rows and a plurality of columns;
a row decoding circuit configured to select a row in the cell array;
a column decoding circuit configured to select columns in the cell array;
a code generation circuit configured to generate an error correction code based on a program data;
a data access circuit configured to program the program data and the error correction code in selected columns that are selected by the column decoding circuit during a program operation, and read a read data and an error correction code corresponding to the read data from the selected columns that are selected by the column decoding circuit during a read operation; and
an error detection circuit configured to detect an error of the read data based on the error correction code and the read data that are read through the data access circuit during the read operation to produce an error detection result and to be enabled or disabled in response to a first enable signal,
wherein the first enable signal is enabled if the program data corresponding to the read data maintains the same value from an initial programming moment, and the first enable signal is disabled otherwise.

6. The one-time program cell array circuit of claim 5, further comprising:
a plurality of correction units configured to correct the error of the read data that is read based on the error detection result of the error detection circuit.

7. A memory device, comprising:
a plurality of memory banks;
a plurality of repair circuits configured to perform a repair operation in the memory banks;

a plurality of test mode circuits configured to perform a setup operation; and a one-time program cell array circuit configured to store repair information to be used in the repair circuits and setup information to be used in the test mode circuits, and to have an error correction function enabled when the repair information is inputted or outputted and disabled when the setup information is inputted or outputted.

* * * * *